(12) United States Patent
Schifone (10) Patent No.: US 7,987,098 B2
(45) Date of Patent: *Jul. 26, 2011

(54) INTERACTIVE COMPUTERIZED COMMUNICATION APPARATUS AND METHOD

(76) Inventor: Eric Schifone, Nashua, NH (US)

(*) Notice: Subject to any disclaimer, the term of this patent is extended or adjusted under 35 U.S.C. 154(b) by 0 days.

This patent is subject to a terminal disclaimer.

(21) Appl. No.: 12/904,703

(22) Filed: Oct. 14, 2010

(65) Prior Publication Data

US 2011/0029871 A1 Feb. 3, 2011

Related U.S. Application Data

(63) Continuation-in-part of application No. 11/881,700, filed on Jul. 30, 2007, now Pat. No. 7,840,415.

(51) Int. Cl.
*G06Q 10/00* (2006.01)
(52) U.S. Cl. ........................................................ 705/1.1
(58) Field of Classification Search .................... 705/1.1
See application file for complete search history.

(56) References Cited

U.S. PATENT DOCUMENTS

| | | | |
|---|---|---|---|
| 2002/0046074 A1 | 4/2002 | Barton | 705/8 |
| 2002/0055870 A1 | 5/2002 | Thomas | 705/10 |
| 2002/0169631 A1 | 11/2002 | Lewis | 705/1 |
| 2003/0085929 A1 | 5/2003 | Huber et al. | 345/810 |
| 2006/0026069 A1 | 2/2006 | Mazurkiewicz et al. | 705/14 |
| 2006/0106780 A1 | 5/2006 | Dagan | 707/3 |
| 2006/0155636 A1* | 7/2006 | Hermann et al. | 705/37 |
| 2006/0229896 A1 | 10/2006 | Rosen et al. | 705/1 |
| 2008/0055398 A1 | 3/2008 | Ryckman | 348/14.1 |
| 2008/0059290 A1 | 3/2008 | McFaul | 705/11 |
| 2008/0074487 A1 | 3/2008 | Ryckman | 348/14.1 |
| 2009/0049095 A1 | 2/2009 | Simon et al. | 707/104.1 |

* cited by examiner

*Primary Examiner* — Jonathan Ouellette
(74) *Attorney, Agent, or Firm* — Hayes Soloway P.C.

(57) ABSTRACT

An interactive computerized apparatus includes first and second interfaces and a server in communication on a computer network. The server has at least a first database storing data relating to a first user at the first interface and a second database storing data relating to a second user at the second interface, the first user having access to the second database and the second user having access to the first database. A video and audio interaction system is housed on the server and has programmable code for interaction between the first user at first interface and the second user at the second interface. The interaction includes the first user accessing the second database, the second user accessing the first database, facilitating communication between the first and second users by contemporaneously exchanging video signals and audio signals. The first and second users communicate contemporaneously via the video and audio interaction system.

17 Claims, 4 Drawing Sheets

INTERACTIVE COMPUTERIZED COMMUNICATION APPARATUS AND METHOD

CROSS REFERENCE TO RELATED APPLICATION

This application is a continuation-in-part of U.S. patent application Ser. No. 11/881,700 filed Jul. 30, 2007, the entire disclosure of which is incorporated herein by reference.

FIELD OF THE DISCLOSURE

The present disclosure is generally related to communication devices and more particularly is related to a method and apparatus for providing an interactive computerized communication device.

BACKGROUND OF THE DISCLOSURE

Many resources are presently available to facilitate computer-based communication between two or more individuals. These resources include exchanging electronic mail, text chats or verbal transmissions; resources that may be used for a variety of purposes, such as to assist businesses in finding candidates to fill available employment positions or to allow two or more people to communicate. Internet computer-driven systems, such as video conferencing systems, may allow some communication between two or more people, but frequently at the expense of large monetary fees and a significant amount of wasted time. Furthermore, current computer-based communication is limited and does not allow people to exchange many of the types of communications that are needed in society today. As a result, communication is often interrupted by the inability of these systems to provide a full-service computer-based communication.

Thus, a heretofore unaddressed need exists in the industry to address the aforementioned deficiencies and inadequacies.

SUMMARY OF THE DISCLOSURE

Embodiments of the present disclosure provide for an interactive computerized apparatus and method. Briefly described, in architecture, one embodiment of the apparatus, among others, can be implemented as follows. A first interface is in communication with a computer network. A second interface is in communication with the computer network and remotely located from the first interface. A server is in communication with the computer network. The server has at least a first database and a second database, wherein the first database stores data relating to a first user at the first interface and the second database stores data relating to a second user at the second interface. The first user has access to the second database and the second user has access to the first database. A video and audio interaction system is housed on the server and has a quantity of programmable code executable on the server, the programmable code having instructions for interaction between the first user at the first interface and the second user at the second interface, wherein the interaction includes the first user accessing the second database, the second user accessing the first database, facilitating communication between the first user and the second user by contemporaneously exchanging a plurality of video signals and a plurality of audio signals, wherein the first and second users communicate contemporaneously via the video and audio interaction system.

The present disclosure can also be viewed as providing a computerized program having programmable code executable on a computerized server. Briefly described, in architecture, one embodiment of the computer program, among others, can be implemented as follows. The computerized program includes instructions causing the computerized server to provide a plurality of interfaces accessible to a plurality of users, the plurality of interfaces accessible through a computerized device. At least two of the plurality of interfaces are adapted to correspond to at least two of the plurality of users, respectively, wherein a quantity of user data is added to each of the at least two interfaces by the at least two users, respectively. A communication is facilitated between the at least two users by substantially synchronizing a plurality of video signals and a plurality of audio signals with a video and audio interaction system, wherein the plurality of video signals and the plurality of audio signals are exchanged contemporaneously between the at least two users. The plurality of video signals and the plurality of audio signals are graphically displayed and audibly presented to each of the at least two users contemporaneously, wherein the at least two users can access the quantity of data added to each of the at least two interfaces while the plurality of video signals and the plurality of audio signals are graphically displayed and audibly presented.

The present disclosure can also be viewed as providing methods for contemporaneous interaction between a first user and a second user with an interactive computerized apparatus. In this regard, one embodiment of such a method, among others, can be broadly summarized by the following steps: providing a first interface and a second interface in communication with a computer network, the second interface remotely located from the first interface; hosting at least a first database and a second database within a server in communication with the computer network; storing data relating to the first user at the first interface within the first database and storing data relating to the second user at the second interface within the second database, wherein the first user has access to the second database and the second user has access to the first database; and facilitating interaction between the first user at first interface and the second user at the second interface with a programmable code executable on the server, wherein the interaction comprises: accessing the second database by the first user; accessing the first database by the second user; facilitating communication between the first user and the second user by contemporaneously exchanging a plurality of video signals and a plurality of audio signals with a video and audio interaction system; and contemporaneously communicating with the second user by the first user via the video and audio interaction system.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
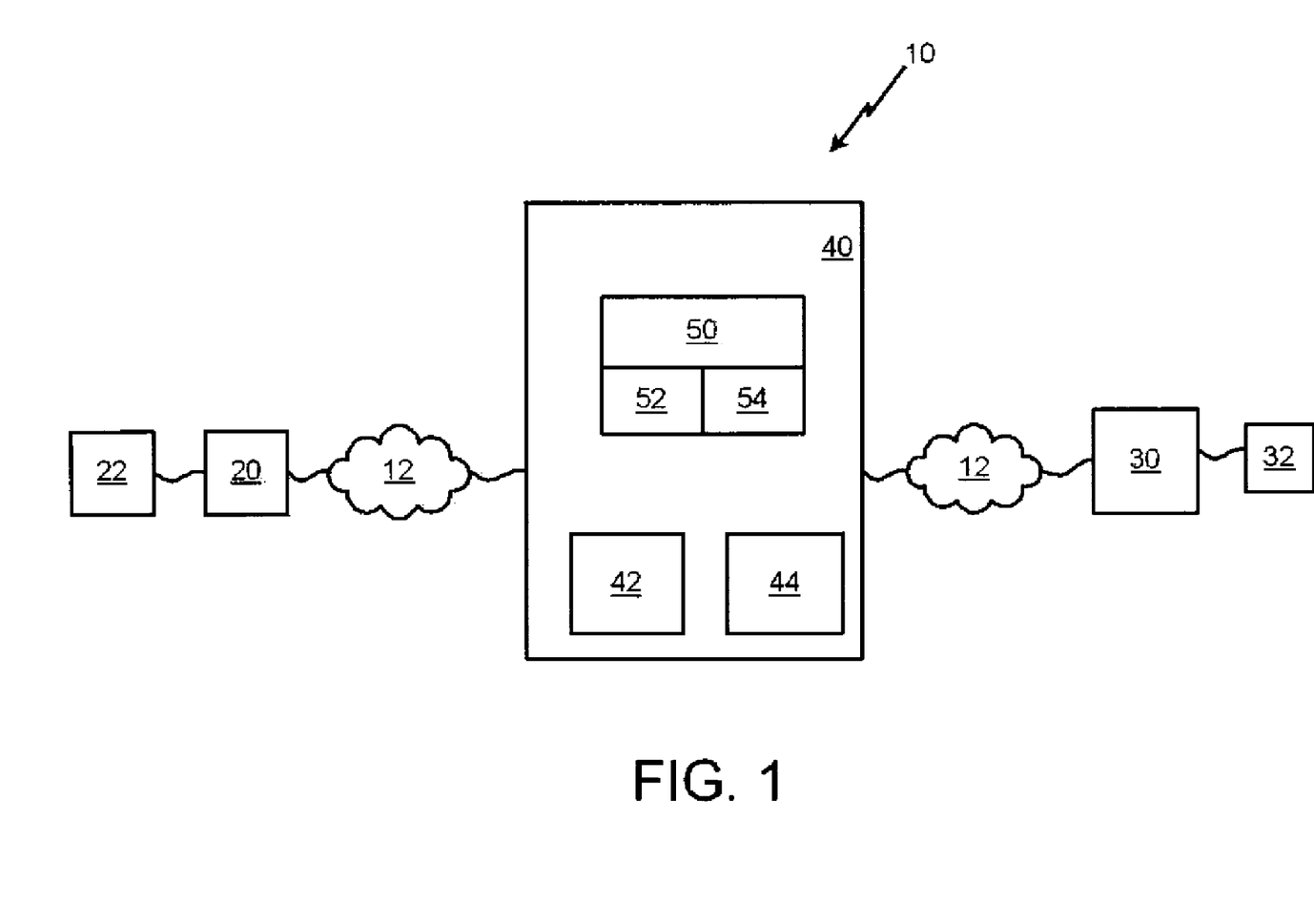
FIG. 1 is a schematic illustration of an interactive computerized apparatus, in accordance with a first exemplary embodiment of the present disclosure.

FIG. 1 is a schematic illustration of an interactive computerized apparatus 10, in accordance with a first exemplary embodiment of the present disclosure. The interactive computerized apparatus 10 includes a first interface 20 in communication with a computer network 12 and a second interface 30 in communication with the computer network 12 and remotely located from the first interface 20. A server 40 is in communication with the computer network 12 and has at least a first database 42 and a second database 44. The first database 42 may store data relating to a first user 22 at the first interface 20 and the second database 44 may store data relating to a second user 32 at the second interface 30. The first user 22 has access to the second database 44 and the second user 32 has access to the first database 42. A video and audio interaction system 50 is housed on the server 40 and has a quantity of programmable code executable on the server. The programmable code has instructions for interaction between the first user 22 at the first interface 20 and the second user 32 at the second interface 30. The interaction includes the first user 22 accessing the second database 44 and the second user 32 accessing the first database 42. The interaction system 50 facilitates communication between the first user 22 and the second user 32 by contemporaneously exchanging a plurality of video signals and a plurality of audio signals, wherein the first user 22 and second user 32 communicate contemporaneously via the video and audio interaction system 50.

The first user 22 and second user 32 of the interactive computerized apparatus 10 may include any type of user, entity or agent that is capable of interacting. Commonly, the first user 22 and the second user 32 are human beings interacting with each other for some purposes, such as to have a conversation, conduct an interview or otherwise exchange information. The first user 22 and the second user 32 may have defined roles within the interaction with each other, and may have titles or other identifying characteristics. For example, the first user 22 may be an informational user providing information to the second user 32, who may be the recipient of the information. Other types of relationships between the first user 22 and the second user 32 may also be present, including interviewer and interviewee, presenter and audience, teacher and student, etc. Any other type of characterization of the first user 22 and the second user 32 is considered within the scope of the present disclosure.

The interaction between the first user 22 and the second user 32 may be used to carry out any number of tasks, processes or procedures, which may include any type of communication, interview, relay of information, entertainment or any other interaction. The first user 22 and the second user 32 may be at a first interface 20 and a second interface 30, respectively. The first and second interfaces 20, 30 may include any computerized device, electronic devices, cellular phones, PDAs or other interface capable of facilitating interaction, or any combination thereof. For example, the first user 22 may be located near the first interface 20, thereby controlling the first interface 20 with any number of input devices. This could include a first user 22 located at a computerized device and controlling the computerized device with an input device, such as a mouse, keyboard, touch screen, or any other input device. Similarly, the second user 32 may be proximate to and controlling the second interface 30. The first and second interfaces 20, 30 may be located remote from one another, which may include two locations separated by distance. For example, the first and second interfaces 20, 30 may be located within the same proximate area, such as the same room or building, and/or the first and second interfaces 20, 30 may be located hundreds or thousands of miles from each other. Any relative location of the first interface 20 to the second interface 30 is considered within the scope of the present disclosure.

The first and second interfaces 20, 30 may be in communication with one or more networks 12. A network 12 may include any configuration of interconnected first and second interfaces 20, 30, and may have any number of communication channels for any number of additional interfaces, users or other agents. The network 12 may have a wired structure, wireless structure, or any combination thereof. In FIG. 1, the network 12 is illustrated in two portions that are connected to the server 40, but may include any configuration of network portions, divisions or sections. For instance, the first and second interfaces 20, 30 may be in communication over the Internet, whereby communication is carried out by any additional number of computer servers, hosts and connections. In addition, the first and second interfaces 20, 30 may also be in communication over an internal network, such as a network substantially located within a building or facility.

The server 40 is in communication with the network 12, the first interface 20 and the second interface 30. Any communication configuration between the server 40, network 12, first interface 20 and second interface 30 may be used, including a configuration where the server 40 is in direct communication with the first and/or second interfaces 20, 30. The server 40 may include any single computerized device, or plurality of computerized devices linked together, that act as a host to deploy or execute any number of computerized programs. The server 40 may be located remote from both the first and second interfaces 20, 30, such as in a separate building or a distant location from the first and second interfaces 20, 30. However, the server 40 may also be located proximate to or integral with either of the first and second interfaces 20, 30. For example, the server 40 may be housed within a computerized device that also houses one of the first or second interfaces 20, 30, such that contemporaneous communication from the first to second users 22, 32 is completed through the first and second interfaces 20, 30 and a network 12.

The server 40 has at least a first database 42 and a second databases 44, but may include any additional number of databases. Further, the first and second databases 42, 44 may be included together within a single database, or separated in any number of additional databases, depending on the design of the interactive computerized apparatus 10. Commonly, the number of databases will substantially correspond to the number of users, such that each of the users has at least one corresponding database. The first and second databases 42, 44, may store data relating to the first user 22 and the second user 32, respectively. This data may include any type of data, such as identification information, system login information, information pertaining to the interaction and any other type of data. The data may be in the form of textual data, pictographic data, videographic data, or any other format, all of which are considered within the scope of the present disclosure. For example, the first user 22 may upload or post information pertaining to the first user's 22 identification, background or interests in the first database 42. In another example, if the first user 22 is a job seeker, the first user 22 may upload a resume, job qualifications and/or employment desires on the first database 42. Similarly, the second user 32 may post or upload any information to the second database 44, such as an employment opportunity. Any data that is uploaded to either of the first and/or second database 42, 44 may be stored indefinitely or disposed of at any time, automatically or upon command.

The first and second databases 42, 44 may be accessible to either of the first and second users 22, 32, including a first database 42 that is accessible to the second user 32, and a second database 44 that is accessible to the first user 22. This configuration may allow either of the first or second users 22, 32 to gain access to at least a portion of the data stored within the first and second databases 42, 44. The accessibility of the data to the first or second users 22, 32 may be complete access or limited access, or any combination thereof. Additionally, either of the first and second users 22, 32 may determine the accessibility of the data within their corresponding first or second databases 42, 44 to the other. For example, the first user 22 may permit the second user 32 to have full access to all data uploaded by the first user 22 to the first database 42, or may limit the access of the second user 32 to only certain portions of the data. Commonly, accessibility of the first or second databases 42, 44 may be limited to only information that the first or second user 22, 32 desires to be known, such as contact information, an identification name, or other commonly public information. Similarly, data that pertains to commonly private information may be inaccessible to a user. In addition, when there is a plurality of users within the interactive computerized apparatus 10, a first user 22 may grant varying levels of access to any segment of the plurality of users.

The video and audio interaction system 50 is housed on the server 40, such that the server 40 executes any programmable code. The video and audio interaction system 50 includes a plurality of programmable code that has instructions for performing actions, such as for facilitating interaction between the first and second users 22, 32. The programmable code may include any type of computer-enabling code, writing in any language, with any combination of instructions, as is understood by one skilled in the art. The video and audio interaction system 50 may also include other devices, such as processors, data inputs, data transmission devices, data analyzing devices and computing devices, to facilitate interaction between the first user 22 and the second user 32.

The interaction facilitated by the video and audio interaction system 50 may include any type of audio and/or visual interaction between the first user 22 and the second user 32. This may commonly include transmitting communications verbally and/or visually; however, any action capable of being transmitted by audio signal and/or video signal is considered an interaction that the video and audio interaction system 50 can facilitate. The video and audio interaction system 50 may include a video-based application 52 and an audio-based application 54, as well as any other portions for other types of interaction. The video and audio interaction system 50 may allow interaction through data exchange, which may include interactions between the first and second users 22, 32 and the first and second databases 42, 44. This may include any combination of visually viewing, downloading, altering, identifying and/or entering data within the first or second databases 42, 44. Any audio and/or visual interaction may be done independently, at the same time as, in sequence and/or in concert with interaction involving data exchange. For example, the first and second users 22, 32 may interact by communicating through audio and video signals while interacting by accessing data on the first or second database 42, 44.

The auditory and visual interaction between the first and second users 22, 32 may include communicating verbally, communicating visually or any combination thereof. This may allow the first and second users 22, 32 to carry on a conversation through the contemporaneous exchange of any number of video signals and audio signals. Within the scope of the present disclosure, a contemporaneous exchange of audio and video signals may be characterized as communications conducted in substantially 'real-time', which includes transmitting the audio and video signals based on operational deadlines, i.e., another audio or video signal. Accordingly, the contemporaneous exchange of the audio and video signals may compose a substantially fluid interaction between the first and second users 22, 32 with the plurality of audio and video signals. This may be accomplished by simultaneous linking the plurality of video and audio signals to correspond to the appropriate and natural cadence of the communication. As is known in the art, the architecture and components of any computerized system may limit or hinder the fluidity of transmission of audio and video signals. This may lead to slight delays in the transmission and receipt of the audio and video signals, in comparison to the idealistic operational deadline, i.e., with no delays. Accordingly, any delay in transmission of the audio and video signals, whether intended or unintended, regardless or cause or consequence, is considered within the scope of the contemporaneous exchange of the plurality of video and audio signals.

The video and audio interaction system 50 allows the first and second users 22, 32, and any additional number of users, to communicate contemporaneously with one another. Contemporaneous communication between the first and second users 22, 32 enhances interaction between the first and second users 22, 32, by allowing for a fluid exchange of communications. As opposed to non-fluid communication, such as through electronic mail and the conventional postal system, contemporaneous communication allows for conversationally timed communications, similar to communications that are present between individuals physically proximate to one another and communications via the telephone. As the first user 22 and the second user 32 are located remote from one another, the video and audio interaction system 50 facilitates interactions that have conventionally only happened when the first and second users 22, 32 are communicating in person or over the telephone.

In use, the interactive computerized apparatus 10 may be used to facilitate any number of tasks or processes, such as conducting interviews, holding discussions and having meetings, just to name a few. As one having skill in the art can recognize, any additional interaction-based tasks may also be facilitated with the interactive computerized apparatus 10, all of which are considered within the scope of the present disclosure. One common use of the interactive computerized apparatus 10 is to facilitate a meeting between the first user 22 and the second user 32. The first and second users 22, 32 may communicate via the audio and video signals and may also access data provided by either of the first and second users 22, 32. For example, the first user 22 could be a product distributor and the second user 32 could be a product supplier. The second user 32 may upload data pertaining to product costs or product availability to the second database 44, and the first user 22 may access that data before, during or after any contemporaneous communication between the first and second users 22, 32. As can be seen, not only can the first and second users 22, 32 enhance interactions through contemporaneous communication, but they may also enhance the exchange of data pertaining to the contemporaneous communication without delaying or disrupting the contemporaneous communication.

Figure 2:
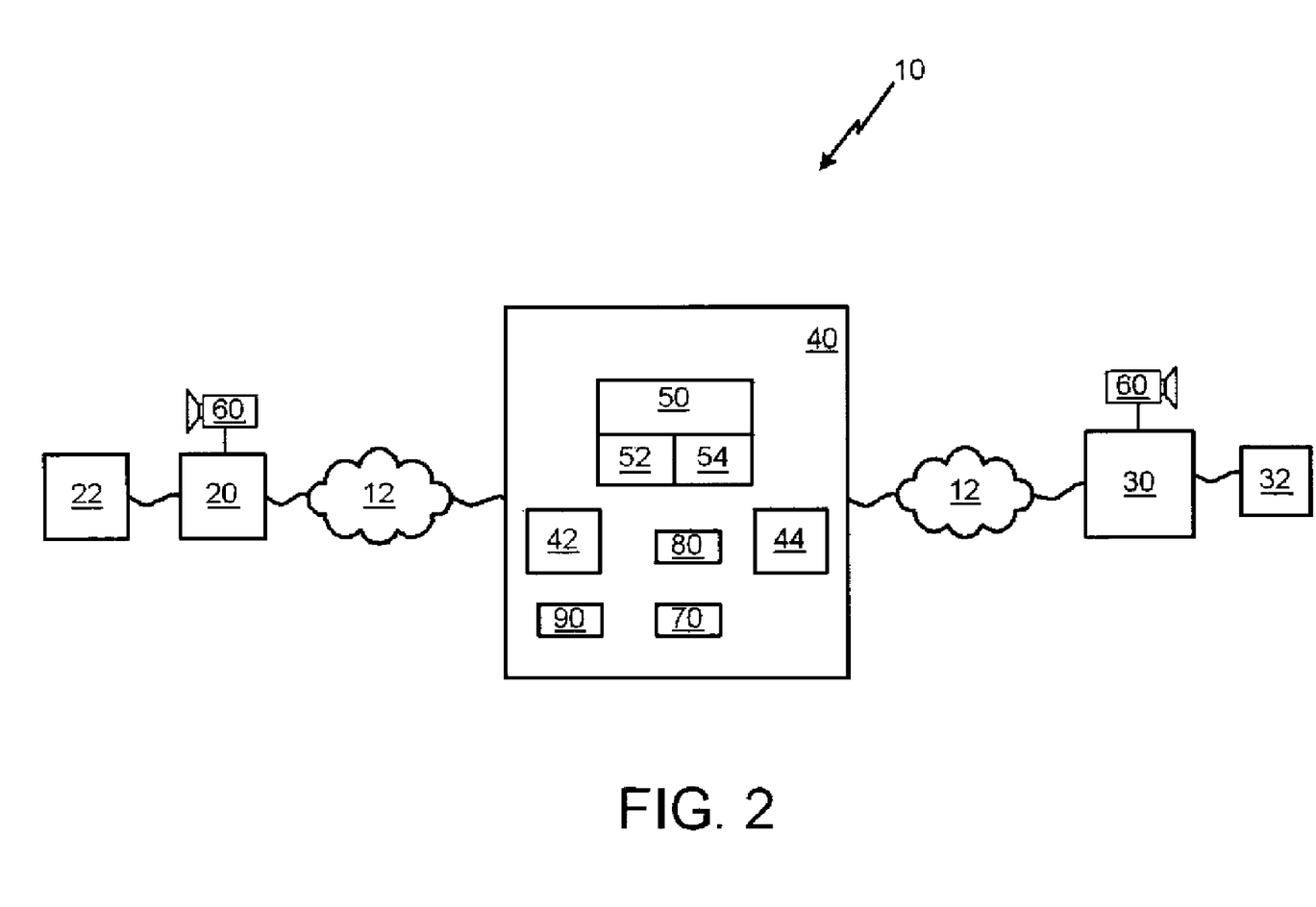
FIG. 2 is a schematic illustration of the interactive computerized apparatus of FIG. 1, in accordance with the first exemplary embodiment of the present disclosure.

FIG. 2 is a schematic illustration of the interactive computerized apparatus of FIG. 1, in accordance with the first exemplary embodiment of the present disclosure. The interactive computerized apparatus 10 may include any number of additional components, variations or configurations. For example, each of the first and second interfaces 20, 30 may include at least one video and audio capable input camera 60 positioned to capture a quantity of video and audio data. The video and audio capable input camera 60 may be one device, or a combination of separate devices positioned to capture any auditory and visual interactions of the first user 22 and/or second user 32, respectively. The video and audio capable input camera 60 may transmit any captured audio and video signals to the video-based application 52 and the audio-based application 54, which may process the video and audio signals to contemporaneously communicate them to either the first user 22 or the second user 32. A notification element 70 may be housed at least partially on the server 40 and may be accessible to at least one of the first user 22 and the second user 32. The notification element 70 may allow the first user 22 or the second user 32 to request an interaction with the other. Any request for interaction, acceptance of a request or denial of a request may be communicated to either of the first and second users 22, 32. This may include sending an electronic message to either of the first and second users 22, 32 and/or displaying a notification character on either of the first or second interfaces 20, 30.

The video and audio interaction system 50 may include a variety of video and audio devices, programs and agents to facilitate interaction between the first and second users 22, 32. For example, the video and audio interaction system 50 may be an Internet Protocol (IP) based video and voice over IP (VoIP) interaction system, wherein the plurality of audio signals may include a plurality of VoIP signals. The audio and video interaction system 50 may also include any of the H, G and T standards developed by the International Telecommunications Union (ITU), and/or the standards developed by the Internet Engineering Task Force (IETF), including the Real-Time Protocol (RPT), Real-Time Control Protocol (RTCP) and the Resource Reservation Protocol (RSVP). The video and audio interaction system 50 may include any of the several standards based transport protocols, including Transmission Control Protocol (TCP), User Datagram Protocol (UDP) and RPT. Any of the features, components, systems, subsystems or configurations conventionally used with any of the above-mentioned standards may be included in the interactive computerized apparatus 10.

The plurality of video and audio signals transmitted between the first and second users 22, 32, may be transported by any type of transport media, including Integrated Services Digital Network (ISDN), Local Area Network (LAN), Wild Area Network (WAN), the Internet, Asynchronous Digital Subscriber Lines (ADSL), Synchronous Digital Subscriber Lines (SDSL) and Virtual Private Networks (VPN), as well as any other system. Other transport media such as 3G and 4G mobile networks may also be used, especially when the first or second interface 20, is a cellular phone, PDA or other mobile computerized device. Other video control, audio control and data control standards not listed herein are also considered within the scope of the present disclosure. Furthermore, applications for enhancing or improving mobility or connectivity of the interactive computerized apparatus 10 may also be included. Any of the features, components, systems, subsystems or characteristics conventionally used with any of the above-mentioned transport media, standards and applications may be included in the interactive computerized apparatus 10.

To enhance the interactive computerized apparatus 10 and the components thereof, a connection status element 80 may be executed on the server 40 and viewable on at least one of the first interface 20 and the second interface 30. The connection status display element 80 may indicate any status of the connection between the first and second users 22, 32 and the video and audio interaction system 50. In addition, a recording element 90 may be executed on the server 40 to record any contemporaneous communication, or a portion thereof. The recording element 90 may save any recorded communication in a database and/or transmit the recorded communication to outside of the server 40. Any recorded communication may be retrievable and accessible by the first and second users 22, 32, or a third party, at any time after it is initially created.

Figure 3:
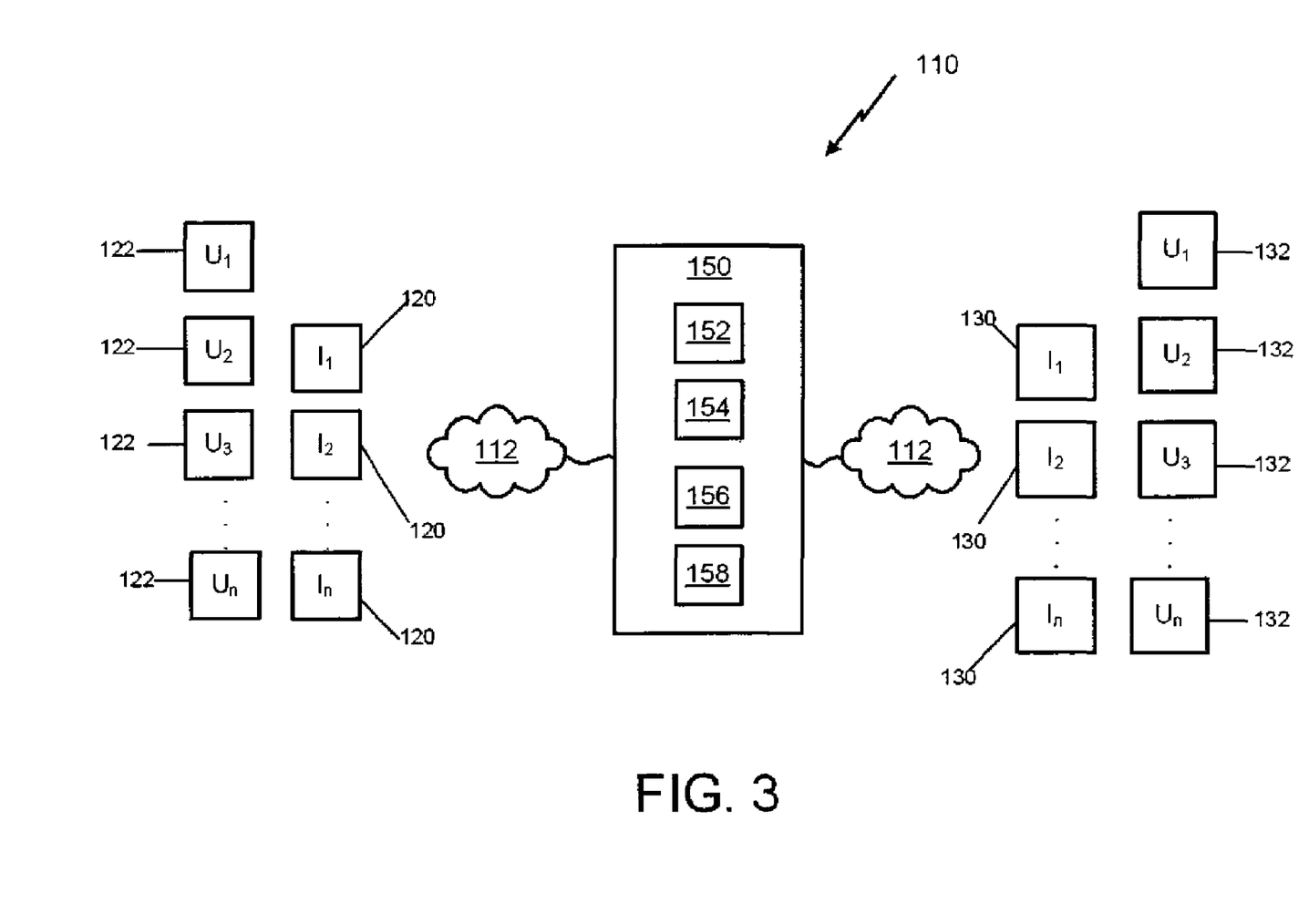
FIG. 3 is a block diagram of a computerized program, in accordance with a second exemplary embodiment of the present disclosure.

FIG. 3 is a block diagram of a computerized program 110, in accordance with a second exemplary embodiment of the present disclosure. The computerized program of the second exemplary embodiment may include any of the features and components disclosed in the first exemplary embodiment, all of which are considered within the scope of the second exemplary embodiment. The computerized program 110 has programmable code executable on a server with instructions for causing the server to perform actions for facilitating contemporaneous communication between users. The computerized program 110 provides for a plurality of first interfaces 120 accessible to a plurality of first users 122, wherein the plurality of first interfaces 120 are accessible through a computerized device. A plurality of second interfaces 130 is accessible to a plurality of second users 132 through a computerized device as well. Similar to the first exemplary embodiment of the present disclosure, the computerized device may include any type of computerized or electronic device, including a personal computer, a network of computers, a cell phone, a FDA, to name a few.

Any number of interfaces (I) and users (U) may be included in the computerized program 110, as illustrated in FIG. 3 with subscript "n" number of interfaces and users, which may include any number of interfaces and/or users. At least two of the plurality of first interfaces 120 are adapted to correspond to at least two of the plurality of first users 122, and at least two of the plurality of second interfaces 130 are adapted to correspond to at least two of the plurality of second users 132. Any of the plurality of first and second users 122, 132 may upload a quantity of user data to each of their respective first and second interfaces 120, 130. The plurality of first and second users 122, 132 may communicate with each other over one or more networks 112, which may also be in communication with a video and audio interaction system 150. The video and audio interaction system 150 my facilitate communication between the plurality of first and second users 122, 132 by substantially synchronizing a plurality of video signals and a plurality of audio signals. The plurality of video and audio signals may be exchanged contemporaneously between the plurality of first and second users 122, 132.

In accordance with the second exemplary embodiment, substantially synchronizing the plurality of video signals and a plurality of audio signals for contemporaneous exchange may allow auditory and visual interaction between the plurality of first and second users 122, 132. This may include communicating verbally, communicating visually or any combination thereof, thereby permitting a conversation between the plurality of first and second users 122, 132 through the contemporaneous exchange of any number of video signals and audio signals. Within the scope of the present disclosure, substantially synchronizing the plurality of video signals and a plurality of audio signals for a contemporaneous exchange of audio and video signals may be characterized as communications conducted in substantially 'real-time', which includes transmitting the audio and video signals based on operational deadlines, i.e., another audio or video signal. Accordingly, the contemporaneous exchange of the audio and video signals may compose a substantially fluid interaction between the plurality of first and second users 122, 132 with the plurality of audio and video signals. This may be accomplished by simultaneous linking the plurality of video and audio signals to correspond to the appropriate and natural cadence of the communication. As is known in the art, the architecture and components of any computerized system may limit or hinder the fluidity of transmission of audio and video signals. This may lead to slight delays in the transmission and receipt of the audio and video signals, in comparison to the idealistic operational deadline, i.e., with no delays. Accordingly, any delay in transmission of the audio and video signals, whether intended or unintended, regardless or cause or consequence, is considered within the scope of the contemporaneous exchange of the plurality of video and audio signals.

The plurality of video signals and the plurality of audio signals may be graphically displayed and audibly presented contemporaneously to the plurality of first and second users 122, 132, respectively. Additionally, the plurality of first and second users 122, 132 may be able to access any data added to each of the plurality of first and second interfaces 120, 130 while the plurality of video signals and the plurality of audio signals are graphically displayed and audibly presented. To accomplish this, the computerized program may include a video application 152, an audio application 154, a data transmission application 156 and a data access application 158. The video and audio applications 152, 154 may each facilitate the transmission and exchange of the plurality of video signals and plurality of audio signals, respectively, as described with respect to FIGS. 1 and 2. The data transmission application 156 may include any application, program, device or agent that facilitates the transmission of data from one user to another. Similarly, the data access application 158 may include any application, program, device or agent that facilitates one user to access the data within the video and audio interaction system 150 and/or data originating from another user.

Figure 4:
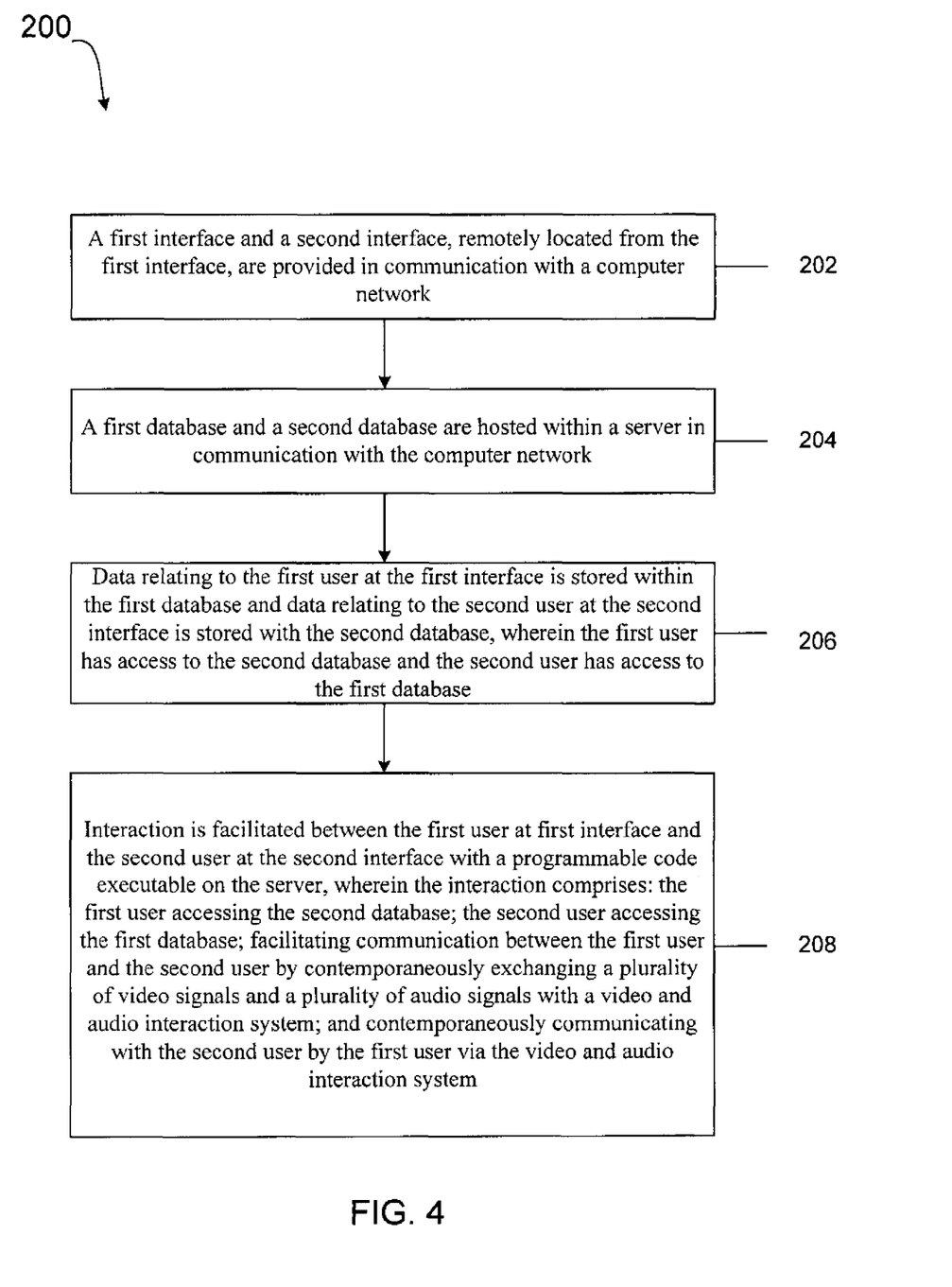
FIG. 4 is a flowchart illustrating a method of contemporaneous interaction between a first user and a second user on an interactive computerized apparatus, in accordance with the first exemplary embodiment of the disclosure.

FIG. 4 is a flowchart 200 illustrating a method of contemporaneous interaction between a first user 22 and a second user 32 on an interactive computerized apparatus 10, in accordance with the first exemplary embodiment of the disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 202, a first interface 20 and a second interface 30, remotely located from the first interface 20, are provided in communication with a computer network 12. At least a first database 42 and a second database 44 are hosted within a server 40 in communication with the computer network 12 (block 204). Data relating to the first user 22 at the first interface 20 is stored within the first database 42 and data relating to the second user 32 at the second interface 30 is stored within the second database 44, wherein the first user 22 has access to the second database 44 and the second user 32 has access to the first database 42 (block 206). Interaction is facilitated between the first user 22 at first interface 20 and the second user 32 at the second interface 30 with a programmable code executable on the server 40, wherein the interaction comprises: the first user 22 accessing the second database 44; the second user 32 accessing the first database 42; facilitating communication between the first user 22 and the second user 32 by contemporaneously exchanging a plurality of video signals and a plurality of audio signals with an video and audio interaction system 50; and contemporaneously communicating with the second user 32 by the first user 22 via the video and audio interaction system 50 (block 208).

The method of contemporaneous interaction between a first user and a second user on an interactive computerized apparatus may include any additional number of steps and processes. For example, a video and audio interaction may be set-up between the first user and the second user. This may include sending a request from one of the first user and the second user to the other of the first user and the second user for the video and audio interaction, receiving a response about the request for the video and audio interaction, and scheduling a time for the video and audio interaction. In addition, as described with respect to FIGS. 1 and 2, any video and audio interaction may include an IP based video and VoIP interaction, and any similar standards, applications or devices.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. An interactive computerized apparatus comprising:
   a first interface in communication with a computer network;
   a second interface in communication with the computer network and remotely located from the first interface;
   a server in communication with the computer network, the server having at least a first database and a second database, wherein the first database stores data relating to a first user at the first interface and the second database stores data relating to a second user at the second interface, the first user having access to the second database and the second user having access to the first database; and
   an Internet Protocol (IP) based video and voice over IP (VoIP) interaction system housed on the server and having a quantity of programmable code executable on the server, the programmable code having instructions for interaction between the first user at the first interface and the second user at the second interface, wherein the interaction includes the first user accessing the second database, the second user accessing the first database, facilitating communication between the first user and the second user by contemporaneously exchanging a plurality of video signals and a plurality of VoIP signals, wherein the first and second users communicate contemporaneously via the IP based video and VoIP interaction system.

2. The interactive computerized apparatus of claim 1, wherein the first user's access to the second database and the second user's access to the first database includes viewing one of the second and first database, respectively.

3. The interactive computerized apparatus of claim 1, wherein the first and second users communicating contemporaneously via an IP based video and VoIP interaction system includes an IP based video and VoIP application within the first and second interfaces.

4. The interactive computerized apparatus of claim 3, wherein the IP based video and VoIP application includes at least one video and audio capable input camera positioned to capture a quantity of video and audio data.

5. The interactive computerized apparatus of claim 3, wherein the IP based video and VoIP application includes a input/output transmitting device positioned to transmit a captured quantity of video and audio data, wherein the captured quantity of video and audio data may be contemporaneously communicated between the first user and the second user over the computer network.

6. The interactive computerized apparatus of claim 1, wherein the interaction between the first user and the second user includes at least one of the first user accessing the second database and the second user accessing the first database while the first user contemporaneously communicates with the second user via the IP based video and VoIP interaction system.

7. The interactive computerized apparatus of claim 1, further comprising a notification element housed at least partially on the server and accessible to at least one of the first user and the second user, wherein when one of the first user and second user requests an interaction with the other of the first user and second user, the notification element sends a notification to the other of the first user and second user.

8. The interactive computerized apparatus of claim 1, wherein the second user posts a quantity of information about at least one employment opportunity within the second database.

9. The interactive computerized apparatus of claim 1, wherein contemporaneously exchanging the plurality of video signals and the plurality of VoIP signals further comprises simultaneously linking the plurality of video signals and the plurality of VoIP signals.

10. The interactive computerized apparatus of claim 1, further comprising a connection status display element, viewable on at least one of the first interface and the second interface, the connection status display element indicating a connection between at least one of the first and second users and the IP based video and VoIP interaction system.

11. The interactive computerized apparatus of claim 1, wherein at least one of the first user and second user accesses user data of the other of the first user and second user, wherein accessing the user data occurs after a start time of the contemporaneous communication and prior to an end time of the contemporaneous communication, wherein the user data is at least a portion of at least one of the data relating to a first user stored in the first database and data relating to a second user stored in the second database.

12. The interactive computerized apparatus of claim 1, further comprising a recording element for recording at least a portion of the contemporaneous communication, wherein the recorded portion of the contemporaneous communication is saved on a database.

13. The interactive computerized apparatus of claim 12, wherein the recorded portion of the contemporaneous communication is accessible by at least one of the first and second users.

14. The interactive computerized apparatus of claim 1, further comprising at least one of textual data and video-based data stored within the first database, the at least one textual data and video-based data uploaded to the first database by the first user, wherein the second user downloads at least one of the textual data and the video-base data.

15. A method for contemporaneous interaction between at a first user and a second user with an interactive computerized apparatus, the method comprising the steps of:
providing a first interface and a second interface in communication with a computer network, the second interface remotely located from the first interface;
hosting at least a first database and a second database within a server in communication with the computer network;
storing data relating to the first user at the first interface within the first database and storing data relating to the second user at the second interface within the second database, wherein the first user has access to the second database and the second user has access to the first database; and
facilitating interaction between the first user at first interface and the second user at the second interface with a programmable code executable on the server, wherein the interaction comprises:
accessing the second database by the first user;
accessing the first database by the second user;
facilitating communication between the first user and the second user by contemporaneously exchanging a plurality of video signals and a plurality of VoIP signals with an Internet Protocol (IP) based video and voice over IP (VoIP) interaction system; and
contemporaneously communicating with the second user by the first user via the IP based video and VoIP interaction system.

16. The method for contemporaneous interaction between at a first user and a second user on an interactive computerized apparatus of claim 15, further comprising the step of setting up an Internet Protocol (IP) based video and voice over IP (VoIP) interaction between the first user and the second user, including the steps of:
sending a request from one of the first user and the second user to the other of the first user and the second user for the IP based video and VoIP interaction;
receiving a response about the request for the video and audio interaction; and
scheduling a time for the video and audio interaction.

17. A computerized program having programmable code executable on a computerized server, the computerized program comprising instructions causing the computerized server to:
provide a plurality of interfaces accessible to a plurality of users, the plurality of interfaces accessible through a computerized device;
adapt at least two of the plurality of interfaces to correspond to at least two of the plurality of users, respectively, wherein a quantity of user data is added to each of the at least two interfaces by the at least two users, respectively;
facilitate a communication between the at least two users by substantially synchronizing a plurality of video signals and a plurality of VoIP signals with an Internet Protocol (IP) based video and voice over IP (VoIP) interaction system wherein the plurality of video signals and the plurality of VoIP signals are exchanged contemporaneously between the at least two users; and
graphically display and audibly present the plurality of video signals and the plurality of VoIP signals to each of the at least two users contemporaneously, wherein the at least two users can access the quantity of data added to each of the at least two interfaces while the plurality of video signals and the plurality of VoIP signals are graphically displayed and audibly presented.

\* \* \* \* \*